W. V. TURNER.
FLUID PRESSURE BRAKE.
APPLICATION FILED MAR. 30, 1909.
1,012,759.
Patented Dec. 26, 1911.
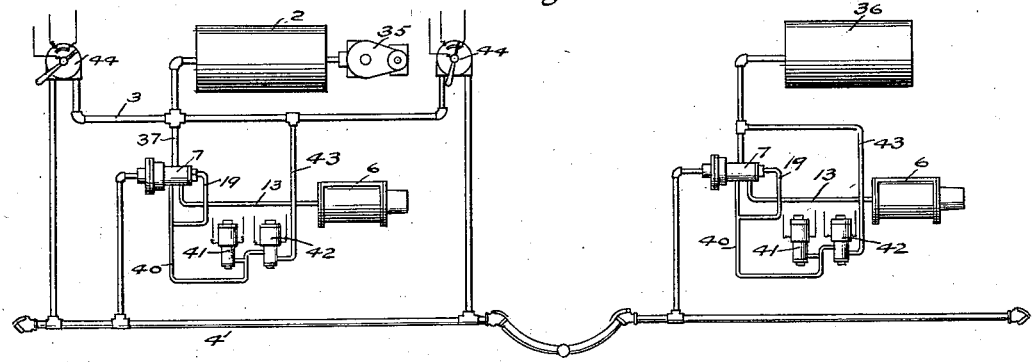
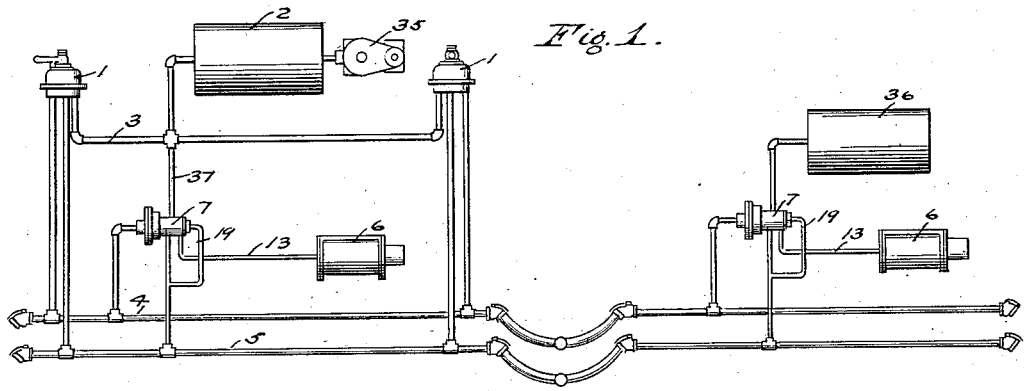
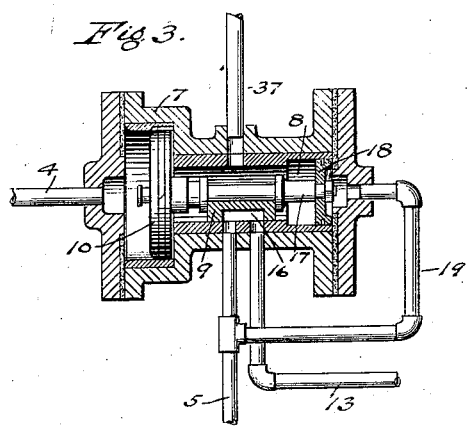
WITNESSES
INVENTOR
Walter V. Turner
by E. Wright
Att'y.

UNITED STATES PATENT OFFICE.

WALTER V. TURNER, OF EDGEWOOD, PENNSYLVANIA, ASSIGNOR TO THE WESTINGHOUSE AIR BRAKE COMPANY, OF PITTSBURGH, PENNSYLVANIA, A CORPORATION OF PENNSYLVANIA.

FLUID-PRESSURE BRAKE.

1,012,759. Specification of Letters Patent. Patented Dec. 26, 1911.

Application filed March 30, 1909. Serial No. 486,744.

*To all whom it may concern:*

Be it known that I, WALTER V. TURNER, a citizen of the United States, residing at Edgewood, in the county of Allegheny and State of Pennsylvania, have invented new and useful Improvements in Fluid-Pressure Brakes, of which the following is a specification.

This invention relates to fluid pressure brakes, and more particularly to an automatic device adapted to apply the brakes upon a sudden reduction in train pipe pressure when a hose bursts, cars pull apart, or other accident happens. A device of this character which is extensively employed in service is shown in my prior Patent No. 882918 and in this construction the brakes are normally operated in service by means of a straight air pipe through which air is supplied to and released from the brake cylinder by manipulation of the motorman's brake valve. A normally charged train pipe is provided, a reduction of pressure in which is adapted to operate an emergency valve device to cut off communication from the straight air pipe to the brake cylinder and to supply air directly to the brake cylinder. Where the brake is designed to supply the full pressure of the system to the brake cylinder in an emergency application, so that there is no excess pressure available for charging the train pipe above normal in releasing the brakes, such as the brake shown in the above mentioned patent, in order to maintain the emergency valve parts in the normal release position and also to insure the full return of the parts from emergency position to this normal position, a yielding resistance device or spring is employed. Occasionally these springs get broken, rust through, or otherwise become damaged, so as to interfere with efficient action of the emergency device.

Accordingly, the principal object of my present invention is to dispense with springs in devices of the above character and it consists in providing means adapted to be operated by fluid under pressure for maintaining the emergency valve parts in normal position.

In the accompanying drawing, Figure 1 is a diagrammatic view of a combined straight air and automatic emergency brake equipment for a motor car and trailer, showing my improvement applied thereto; Fig. 2 a similar view of an electro-pneumatic brake equipment also showing my invention applied; and Fig. 3 a vertical section of my improved emergency valve device.

According to Fig. 1 of the drawing, my invention is applied to an equipment comprising a motorman's brake valve 1, a main reservoir 2, supplied with air by a motor driven compressor 35 and connected to the brake valve 1 by a pipe 3, emergency train pipe 4, independent or straight air pipe 5, and brake cylinder 6, on the motor car and on the trailer car the equipment is similar, except that an auxiliary reservoir 36 is employed for supplying air to operate the brakes instead of the main reservoir. The emergency valve device 7 is normally in a position to maintain a free, open communication from the straight air pipe 5 to the brake cylinder 6 and comprises a slide valve 9 having a cavity 16 for connecting brake cylinder pipe 13 with the straight air pipe 5 in the normal inner position of the parts. The slide valve 9 is operated by a piston 10, the chamber at the outer face of which is in open communication with the emergency train pipe 4. The valve chamber 8 is connected by a pipe 37 to the main reservoir 2 on the motor car or to the auxiliary 36 on the trailer car. As is the case with the construction shown in my prior Patent No. 882918, the brakes may be applied and released in service by manipulation of the motorman's brake valve 1, through the straight air pipe 5 and cavity 16 in the slide valve 9. The brakes are applied in emergency by turning the brake valve to a position for suddenly venting air from the train pipe 4, or by the bursting of a hose or the pulling apart of the cars of the train. The piston 10 of the emergency valve device on each car is then shifted outwardly and the slide valve 9 is actuated to cut off the straight air pipe 5 and open communication from the valve chamber 8 to the brake cylinder pipe 13. Air from the main reservoir or other reservoir is then admitted to the brake cylinder to apply the brakes with full force. To release the brakes, the train pipe pressure is increased to normal pressure by movement of the brake valve to release position and the fluid pressures on opposite sides of the piston 10 become equalized. In this above mentioned prior patent a spring acting on the emergency piston is employed for then returning the parts to and for maintaining them in normal position. According to my present invention, I provide the inner end of the piston stem 17 with a piston head 18, the chamber at the outer face of which is in open communication through a pipe 19 with the straight air pipe 5. It will now be evident that as the straight air pipe 5 is open to the atmosphere in the release position of the brake valve, upon increasing the train pipe pressure to normal in the usual manner in order to release the brakes there will be an unbalanced fluid pressure acting on the outer face of piston 10 according to the area of the piston head 18, and thereby the parts are promptly shifted to their normal inner position. The piston head 18 is preferably adapted to seat and make an air tight joint in its inner position so as to prevent leakage of air from the valve chamber 8 to the straight air pipe.

The improved emergency valve device may be applied to various other types of brake equipment such as an electro-pneumatic system, for example, and in Fig. 2 of the drawing I have shown my improvements applied to an apparatus of this character. Instead of the straight air pipe, a pipe 40 is normally connected to the brake cylinder pipe by the cavity 16 of the slide valve 9 and a suitable electro-pneumatic mechanism is provided in the pipe 40 for controlling the admission of fluid under pressure to and its release from the brake cylinder, such as a release magnet valve 41 and an application magnet valve 42 having a supply pipe 43 connected to the main or other reservoir on the car, the usual train wires and contacts in the brake valves 44 being provided for controlling the operation of the magnet valves. The brakes are then applied and released in service through the pipe 40 by the operation of the magnet valves 41 and 42 in the usual manner and an emergency application is produced by a sudden reduction in train pipe pressure in the same manner as described in connection with the construction shown in Fig. 1 of the drawing, as will be apparent. The pipe 19 being connected to the pipe 40, the piston head 18 is open to the atmosphere through the release magnet valve 41, in release position of the brake switch, so that in releasing the brakes, the emergency valve mechanism is shifted to the normal release position upon increasing the pressure in the train pipe, and the parts are then maintained in this position by the unbalanced train pipe pressure acting on the larger piston head 10.

Having now described my invention, what I claim as new and desire to secure by Letters Patent, is:—

1. An automatic valve device comprising a piston and valve means operating upon a reduction in train pipe pressure for applying the brakes and fluid pressure operated means subject on one side to atmospheric pressure for returning the said piston and valve means to normal release position.

2. An automatic valve device comprising a piston subject on one side to train pipe pressure, valve means operated thereby for supplying air to the brake cylinder, and a movable abutment normally subject on one side to atmospheric pressure for maintaining the parts in normal release position.

3. In a fluid pressure brake, the combination with a train pipe and brake cylinder, of an emergency valve device comprising a piston having differential piston heads subject in one direction to train pipe pressure and in the opposite direction to atmospheric pressure and having the pressure of a reservoir acting between said piston heads and valve means operated thereby for supplying air to the brake cylinder.

4. In a fluid pressure brake, the combination with a train pipe and brake cylinder, of a valve device comprising valve means having a normal position in which communication is open for applying and releasing the brakes in service, a piston operated by a reduction in train pipe pressure for cutting off said communication and supplying air directly to the brake cylinder, and a piston head subject on one side to atmospheric pressure for returning the parts to normal position upon increasing the train pipe pressure.

5. In a fluid pressure brake, the combination with a train pipe and brake cylinder, of valve means for controlling the admission of fluid under pressure to the brake cylinder, and an operating piston therefor, comprising differential heads subject in one direction to variations in train pipe pressure in the opposite direction to atmospheric pressure and to the pressure of fluid from a substantially constant source intermediate said heads.

6. In a fluid pressure brake, the combination with a train pipe and brake cylinder, of an automatic valve device having a normal position establishing a communication through which the brakes are applied and released in service and comprising valve means and a differential piston subject in one direction to train pipe pressure and in the opposite direction to pressure from a substantially constant source and atmospheric pressure.

7. In a fluid pressure brake, the combination with a train pipe, brake cylinder, and main reservoir, of a service application and release pipe, an automatic valve device normally establishing communication from said application and release pipe to the brake cylinder and comprising valve means and an operating piston having differential heads, one subject to the opposing pressures of the train pipe and main reservoir and the other normally subject on one side to a different pressure.

8. In a fluid pressure brake, the combination with a train pipe, brake cylinder, straight air pipe and main reservoir, of an automatic valve device having a normal position connecting the brake cylinder with the straight air pipe and comprising valve means and an operating piston having differential heads one subject to the opposing pressures of the train pipe and main reservoir and operating upon a reduction in train pipe pressure for cutting off said communication and supplying air from the main reservoir to the brake cylinder and the other subject to atmospheric pressure for returning the parts to normal position upon an increase in train pipe pressure.

9. In a fluid pressure brake, the combination with a train pipe, of an automatic valve device having a differential piston subject on one side to train pipe pressure and valve means operated by said piston for effecting an emergency application of the brakes at the full pressure of the brake system and means for venting air from one face of said piston to thereby shift same to release position upon increasing the train pipe pressure.

In testimony whereof I have hereunto set my hand.

WALTER V. TURNER.

Witnesses:
 WM. M. CADY,
 A. M. CLEMENTS.

---

Copies of this patent may be obtained for five cents each, by addressing the "Commissioner of Patents, Washington, D. C."